(12) United States Patent
Muresan et al.

(10) Patent No.: US 12,343,801 B2
(45) Date of Patent: Jul. 1, 2025

(54) NANOPARTICLES AND PREPARATION METHOD

(71) Applicant: Johnson Matthey Hydrogen Technologies Limited, London (GB)

(72) Inventors: Nicoleta Muresan, Reading (GB); Geoffrey Spikes, Reading (GB)

(73) Assignee: Johnson Matthey Hydrogen Technologies Limited, London (GB)

( * ) Notice: Subject to any disclaimer, the term of this patent is extended or adjusted under 35 U.S.C. 154(b) by 827 days.

(21) Appl. No.: 17/255,579

(22) PCT Filed: Jul. 19, 2019

(86) PCT No.: PCT/GB2019/052018
§ 371 (c)(1),
(2) Date: Dec. 23, 2020

(87) PCT Pub. No.: WO2020/016591
PCT Pub. Date: Jan. 23, 2020

(65) Prior Publication Data
US 2021/0220912 A1 Jul. 22, 2021

(30) Foreign Application Priority Data
Jul. 20, 2018 (GB) ..................... 1811895

(51) Int. Cl.
*H01M 8/1004* (2016.01)
*B22F 1/00* (2022.01)
(Continued)

(52) U.S. Cl.
CPC ............... *B22F 9/30* (2013.01); *B22F 1/054* (2022.01); *B22F 9/24* (2013.01); *H01M 4/921* (2013.01); *H01M 8/1004* (2013.01); *B22F 2009/165* (2013.01); *B22F 2009/245* (2013.01); *B22F 2201/01* (2013.01); *B22F 2301/25* (2013.01); *B22F 2304/054* (2013.01); *B82Y 30/00* (2013.01); *B82Y 40/00* (2013.01)

(58) Field of Classification Search
None
See application file for complete search history.

(56) References Cited

U.S. PATENT DOCUMENTS

| 8,278,240 B2 | 10/2012 | Tange et al. |
| 2010/0152041 A1* | 6/2010 | Tange ............... B01J 37/086 977/773 |
| 2014/0113218 A1 | 4/2014 | Erlebacher et al. |

FOREIGN PATENT DOCUMENTS

| CN | 107930636 A | 4/2018 |
| JP | 2-237644 A | 9/1990 |
| JP | 2008-266755 A | 11/2008 |
| JP | 2016-148078 A | 8/2016 |
| JP | 2016-198736 A | 12/2016 |

OTHER PUBLICATIONS

Feng et al., Journal of Colloid and Interface Sciences, 2017, 493, 190-17. (Year: 2017).*

(Continued)

*Primary Examiner* — Zhongqing Wei
(74) *Attorney, Agent, or Firm* — BakerHostetler

(57) ABSTRACT

The present invention concerns methods of forming metal-containing nanoparticles or oxide thereof, especially metal alloy nanoparticles. The method the steps of providing at least two different kinds of transition metal ion by providing at least two kinds of metal ion-containing compound; a heating step in which the at least two metal ion-containing compounds are subjected to a temperature of at least 300° C. to form the metal alloy nanoparticles; a cooling step comprising cooling the product of step b; and each metal ion-containing compound is a transition metal complex having ligands coordinated to a transition metal ion, the ligands being selected from the group consisting of glyoxime; a glyoxime derivative; salicylaldimine; and a salicylaldimine derivative. The preferred methods are solution-based methods. Products of the methods are also described, as are their uses as electrocatalysts, as well as uses of the metal ion-containing compounds for making nanoparticles.

14 Claims, 3 Drawing Sheets

(51) Int. Cl.
*B22F 1/054* (2022.01)
*B22F 9/24* (2006.01)
*B22F 9/30* (2006.01)
*H01M 4/92* (2006.01)
B22F 9/16 (2006.01)
B82Y 30/00 (2011.01)
B82Y 40/00 (2011.01)

(56) References Cited

OTHER PUBLICATIONS

Ahn, Chi-Yeong et al., "Effect of N-doped carbon coatings on the durability of highly loaded platinum and alloy catalysts with different carbon supports for polymer electrolyte membrane fuel cells", International Journal of Hydrogen Energy 43 (2018), 10070-10081, Apr. 30, 2018.

Feng Yue et al., "Porous bimetallic PdNi catalyst with high electrocatalytic activity for ethanol electrooxidation", Journal of Colloid and Interface Science, Academic Press, Inc., US, Jan. 11, 2017, vol. 493, pp. 190-197. whole document.

T. C. Deivaraj et al., "Preparation of PtNi nanoparticles for the electrocatalytic oxidation of methanol", Journal of Materials Chemistry, Jan. 1, 2003, vol. 13, No. 10, p. 2555. whole document.

Wu H et al., "PtxNi alloy nanoparticles as cathode catalyst for PEM fuel cells with enhanced catalytic activity", Journal of Alloys and Compounds, Elsevier Sequoia, Lausanne, CH, Nov. 20, 2009, vol. 488, No. 1, pp. 195-198. whole document.

* cited by examiner

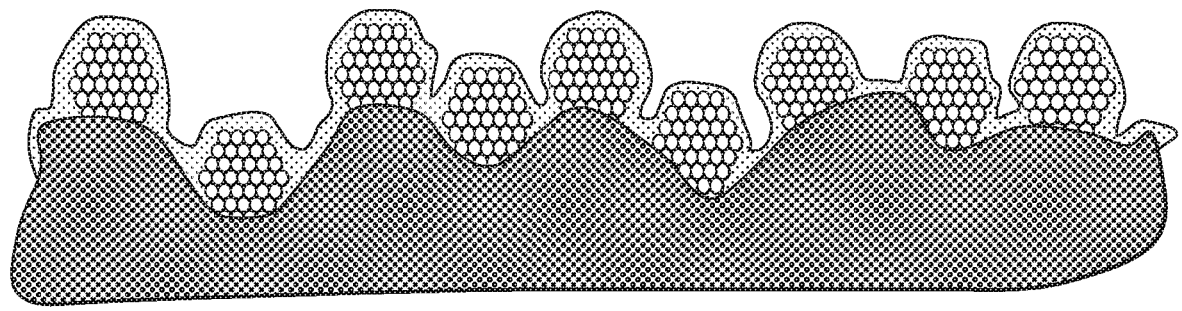
FIG. 1
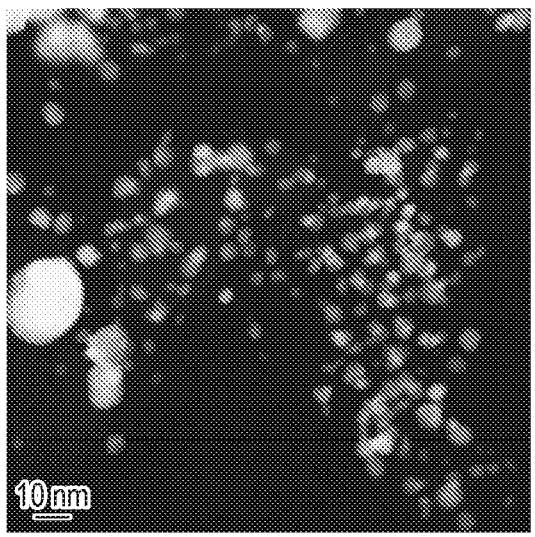 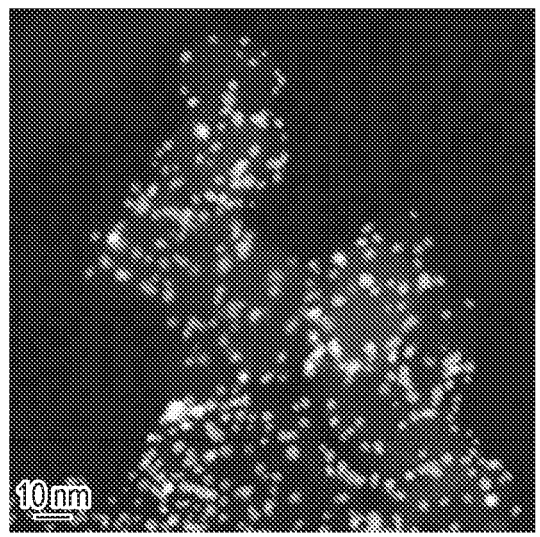
FIG. 2A    FIG. 2B

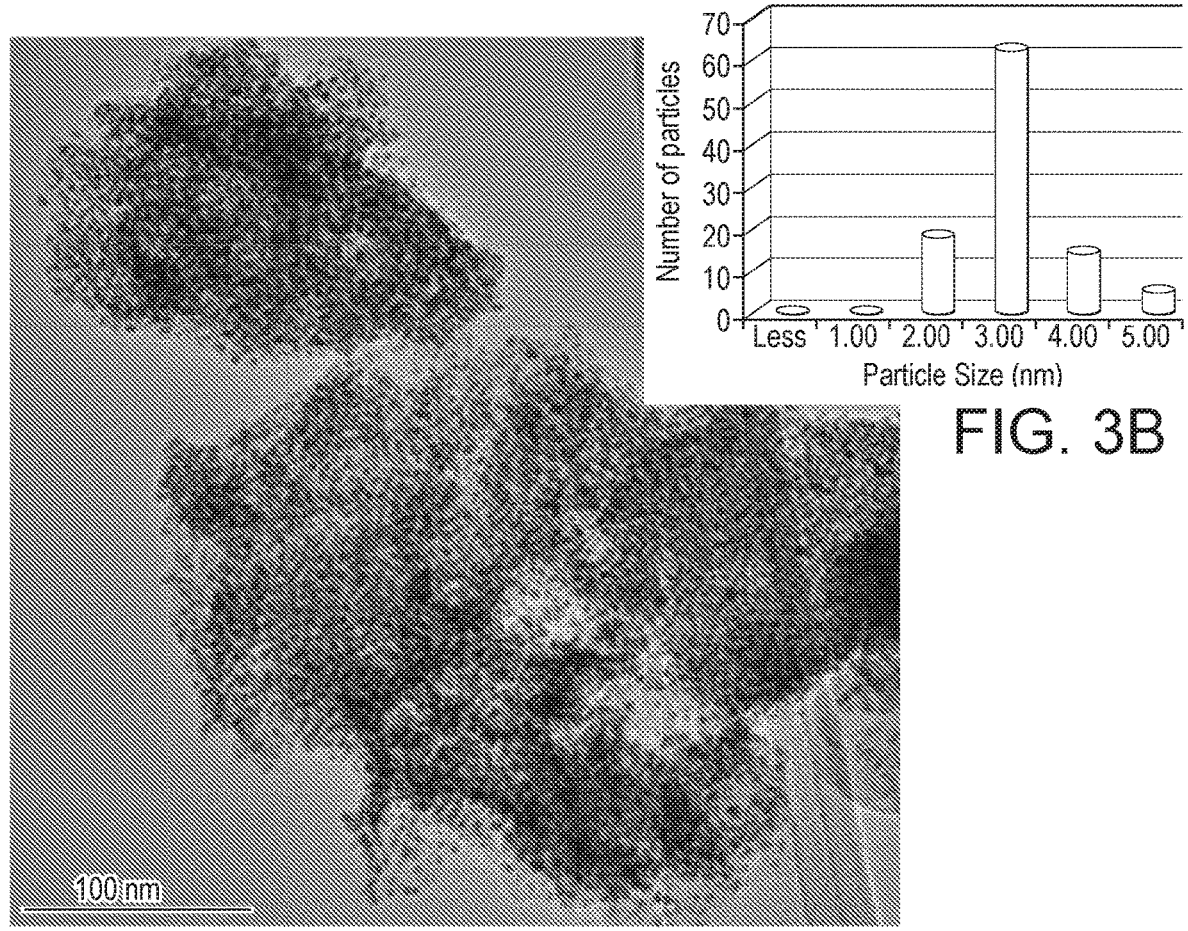
FIG. 3B
FIG. 3A
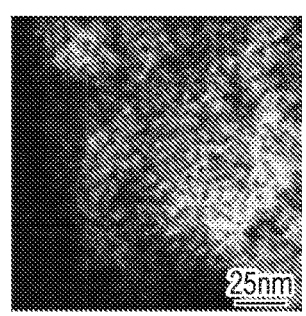 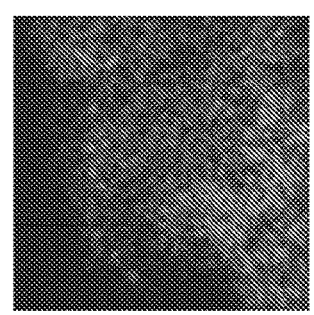
FIG. 3C   FIG. 3D

NANOPARTICLES AND PREPARATION METHOD

FIELD OF THE INVENTION

The present invention relates to a method of preparing metal nanoparticles. In particular, but not exclusively, the present invention relates to a method of preparing metal nanoparticles, including metal alloy nanoparticles, that are suitable for use as catalytic materials in a fuel cell, especially a proton exchange membrane fuel cell.

BACKGROUND

A fuel cell is an electrochemical cell comprising two electrodes separated by an electrolyte. A fuel, such as hydrogen or an alcohol e.g. methanol or ethanol, is provided to the anode. An oxidant, such as oxygen or air, is provided to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

In proton exchange membrane (PEM) fuel cells, the electrolyte is a solid polymeric membrane. The membrane is electronically insulating but proton conducting. Protons, produced at the anode, are transported across the membrane to the cathode. At the cathode the protons combine with oxygen to form water.

The principle component of a PEM fuel cell is known as a membrane electrode assembly (MEA) and is essentially composed of five layers. The central layer is the polymer ion-conducting membrane. On either side of the ion-conducting membrane there is an electrocatalyst layer, containing an electrocatalyst designed for the specific electrochemical reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore, the gas diffusion layer must be porous and electrically conducting.

Electrocatalysts for fuel oxidation and oxygen reduction are typically based on platinum or platinum alloyed with one or more other metals. The platinum or platinum alloy catalyst can be in the form of unsupported nanometre sized particles (such as metal blacks or other unsupported particulate metal powders) or can be deposited as even higher surface area particles onto a conductive carbon substrate, or other conductive material (a supported catalyst).

The MEA can be constructed by several methods. The electrocatalyst layer may be applied to the gas diffusion layer to form a gas diffusion electrode. Two gas diffusion electrodes can be placed either side of an ion-conducting membrane and laminated together to form the five-layer MEA. Alternatively, the electrocatalyst layer may be applied to both faces of the ion-conducting membrane to form a catalyst coated ion-conducting membrane. Finally, an MEA can be formed from an ion-conducting membrane coated on one side with an electrocatalyst layer, a gas diffusion layer adjacent to that electrocatalyst layer, and a gas diffusion electrode on the other side of the ion-conducting membrane.

Typically, tens or hundreds of MEAs are required to provide enough power for most applications, so multiple MEAs are assembled to make up a fuel cell stack. Flow field plates are used to separate the MEAs. The plates perform several functions, including supplying the reactants to the MEAs, removing products, providing electrical connections and providing physical support.

Electrocatalysts for use in a fuel cell are often based on alloys of metals or metal oxides. It is desirable to have small particles of the alloys to maximise the available surface area for catalysis of the appropriate reaction. One difficulty in the art is that the formation of metal alloys requires heating at high temperature, such as 900° C. or more, to sufficiently intermix the different kinds of metal atoms. Unless widely spaced, individual nanoparticles can often agglomerate during such a heating step. Thus, metal alloy particles can grow to a size that leads to less efficient use of the metal. Thus, the provision of particularly small alloy particles is not straightforward.

Ahn et al. (Int. J. Hydrogen Energy, 2018) disclose the preparation of platinum- and platinum-nickel alloy catalysts having increased durability by forming a nitrogen-doped carbon sheet on the catalyst surface through dopamine coating. The authors report that the protective shell prevents agglomeration of adjacent metal nanoparticles during degradation and/or heat treatment processes.

Preferred embodiments of the present invention seek to overcome one or more of the above disadvantages of the prior art. In particular, preferred embodiments of the present invention seek to provide an improved method for producing metal alloy nanoparticles, as well as improved metal alloy nanoparticles for use as catalysts particularly in fuel cells.

SUMMARY OF THE INVENTION

According to a first aspect of the invention, there is provided a method of forming metal alloy nanoparticles, the method comprising:
 a. providing at least two different kinds of transition metal ion by providing at least two kinds of metal ion-containing compound;
 b. a heating step in which the at least two metal ion-containing compounds are subjected to a temperature of at least 300° C. to form the metal alloy nanoparticles;
 c. a cooling step comprising cooling the product of step b; and optionally
 d. a passivating step in which the product of step c is passivated; and/or
 e. a step of acid leaching the product of step c or step d;
wherein each metal ion-containing compound is a transition metal complex having ligands coordinated to a transition metal ion, the ligands being selected from the group consisting of glyoxime; a glyoxime derivative; salicylaldimine; and a salicylaldimine derivative.

According to a second aspect of the invention, there is provided a method of forming metal-containing nanoparticles or oxide thereof, the method comprising:
 a. providing one or more transition metal ions by providing one or more metal ion-containing compounds;
 b. dissolving the one or more metal ion-containing compounds in a solvent;
 c. a heating step in which the one or more metal ion-containing compounds are subjected to a temperature of at least 300° C. to form metal-containing nanoparticles or oxide thereof;
 d. a cooling step comprising cooling the product of step c; and optionally
 e. a passivating step in which the product of step d is passivated; and/or
 f. a step of acid leaching the product of step d or step e;
wherein the one or more metal ion-containing compounds are transition metal complexes having ligands coordinated to a transition metal ion, the ligands being selected from the group consisting of glyoxime; a glyoxime derivative; salicylaldimine; and a salicylaldimine derivative.

Preferably, each method of the first and second aspects comprises providing a support such that the metal alloy nanoparticles, metal-containing nanoparticles, or oxide thereof, are formed on the support. Such supported nanoparticles are advantageous in terms of processing and downstream applications. Further preferably, the heating step of these aspects is carried out in an inert or reducing atmosphere or vacuum. This is believed to permit the formation of a coating on the nanoparticle surface during nanoparticle formation, advantageously contributing to the limitation or prevention of agglomeration of multi metal-containing, especially alloy, nanoparticles or oxides thereof particularly at the higher temperatures required (e.g. to promote intermixing).

According to a third aspect of the invention, there is provided metal alloy nanoparticles, metal-containing nanoparticles or oxide thereof, or metal-containing nanoparticles having a coating comprising carbon, nitrogen and oxygen produced by the methods of the first or second aspects.

According to further aspects of the invention, there is provided an electrocatalyst comprising the metal alloy nanoparticles or metal-containing nanoparticles or oxide thereof; an electrode comprising the metal alloy nanoparticles or metal-containing nanoparticles or oxide thereof or the electrocatalyst; an MEA comprising the metal alloy nanoparticles or metal-containing nanoparticles or oxide thereof, the electrocatalyst or the electrode; and a fuel cell comprising the metal alloy nanoparticles or metal-containing nanoparticles or oxide thereof, the electrocatalyst, the electrode, or the MEA.

Still further aspects of the invention relate to a use of at least two metal ion-containing compounds which are selected from the group consisting of metal glyoximes, metal glyoxime derivatives, metal salicylaldimines, and metal salicylaldimine derivatives, in a method of forming metal alloy nanoparticles or oxide thereof; use of a metal ion-containing compound which is a metal glyoxime, a metal glyoxime derivative, a metal salicylaldimine or a metal salicylaldimine derivative, in a method of forming metal-containing nanoparticles or oxide thereof, the method comprising dissolving the metal ion-containing compound in a solvent; and use of the metal alloy nanoparticles or metal-containing nanoparticles or oxide thereof as an electrocatalyst.

It will be appreciated that features described in relation to one aspect of the invention may be equally applicable in another aspect of the invention. For example, features described in relation to the first aspect of the invention, may be equally applicable to the second, third and/or further aspects of the invention, and vice versa. Some features may not be applicable to, and may be excluded from, specific aspects of the invention but this will be clear from the context.

DESCRIPTION OF THE DRAWINGS

Embodiments of the present invention will now be described, by way of example, and not in any limitative sense, with reference to the accompanying drawings, of which:

FIG. 1 is a schematic representation of supported metal alloy nanoparticles prepared according to the methods of the present invention.

FIG. 2a shows a transmission electron microscope (TEM) image of metal alloy nanoparticles prepared using base hydrolysis chemistry and a 900° C. annealing step.

FIG. 2b shows supported metal alloy nanoparticles prepared according to the methods of the present invention also annealed at 900° C. The scale bar in each of FIGS. 2a and 2b represents 10 nm.

FIG. 3a shows a TEM image of supported metal alloy nanoparticles prepared according to the methods of the present invention. The scale bar represents 100 nm.

FIG. 3b shows a particle size distribution for the metal alloy nanoparticles of the same sample used for FIG. 3a.

FIG. 3c shows energy dispersive x-ray (EDX) analysis of part of the sample shown in FIG. 3a. The light grey represents Ni. The scale bar is 25 nm.

FIG. 3d shows EDX analysis of the same sample shown in FIG. 3c. The light grey represents Pt. The scale base is 25 nm.

DETAILED DESCRIPTION

Figure 3E:
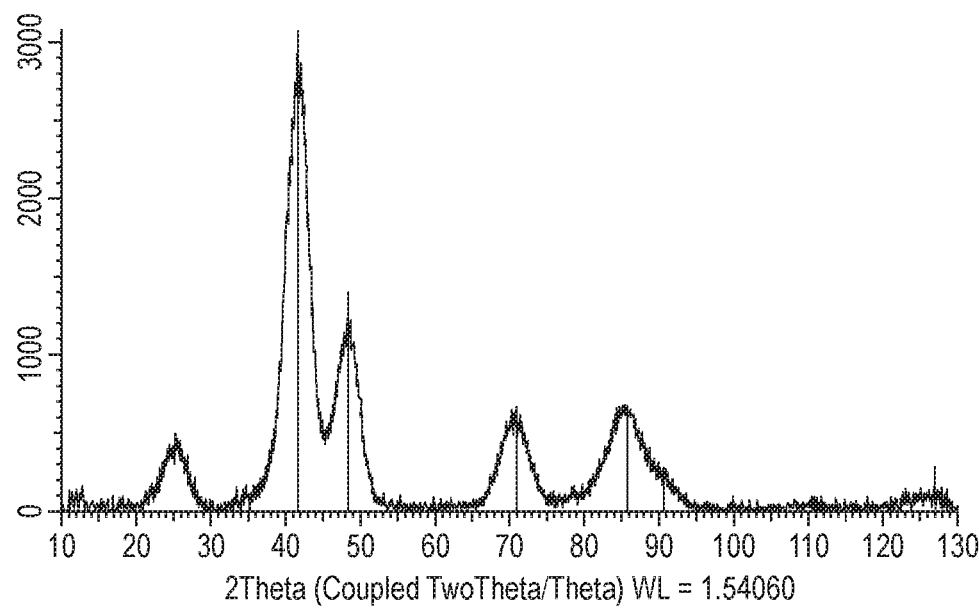
FIG. 3e is an X-ray diffraction (XRD) pattern of the same sample used for FIG. 3a. The observed scattering can be assigned to a mixture of poorly crystalline Ni and Pt cubic alloy phases and the carbon support, with the reference pattern for $Pt_{0.5}Ni_{0.5}$ indicated. There is no evidence for unalloyed Pt or Ni.

The present invention has several advantages, including but not limited to:

it provides a one-pot method for preparing single metal nanoparticles, metal alloy nanoparticles, nanoparticles comprising an intimate mixture of metals or oxides thereof, of a size useful for various catalytic and related applications and especially alloys suitable for use as electrocatalysts;

it provides a material having metal-containing nanoparticles of controllable size and composition, and which have a relatively high homogeneity and distribution across the support, leading in turn to improved properties;

the method avoids significant growth of nanoparticles, particularly metal alloy nanoparticles; and there is increased interaction between metal and support, where present, which the inventors believe leads to more stable supported metal-containing nanoparticles, especially alloys, suitable for use as electrocatalysts.

The present inventors have surprisingly found that formation of metal-containing or alloy nanoparticles using certain kinds of metal ion-containing compounds as starting materials suppresses growth or migration of the product nanoparticles. Thus, it is surprisingly possible to achieve particularly small metal alloy nanoparticles, which metal alloy nanoparticles have been found to have improved homogeneity over prior art methods.

Without wishing to be bound by theory, the present inventors believe that a thin coating of nitrogen-doped carbon forms around the metal alloy nanoparticles during preparation. The inventors believe that this coating may minimise, prevent or contribute to prevention or minimization of significant agglomeration of the metal alloy nanoparticles, particularly during the heating step.

Additionally, the inventors have surprisingly found that it is possible using the methods of the invention to form supported metal alloy nanoparticles at an annealing temperature of around 900° C. with an average particle size of 3 nm. To the best of the inventor knowledge, this is the first time that such has been reported at high loadings e.g. more than 20 wt %.

At a general level, the present invention provides metal nanoparticles, particularly supported metal nanoparticles and particularly supported transition metal nanoparticles. There is believed to be a wide range of kinds of nanoparticles that can be provided according to the invention, and that the adaptability of the present invention leads to the potential to apply the present disclosure to a range of kinds of support, and to a range of catalysts and related materials.

For example, the present invention provides a route for the synthesis of single-metal nanoparticles or multi-metal nanoparticles, or oxides of each of the single- and multi-metal nanoparticles. The general terms 'metal nanoparticles' or 'metal-containing nanoparticles' are used herein to encompass each of these options. The term 'multi-metal nanoparticles' encompasses nanoparticles comprising intimate mixtures of metals as well as metal alloy nanoparticles, and is not particularly limited by number of different kinds of metals (though two is generally most common). References to 'oxide thereof' means an oxide of the metal, and refers to each type of single- or multi-metal containing component listed.

In general, the present application prefers the provision of supported metal-containing nanoparticles and downstream products or uses comprising them.

Definitions and Explanations

As used herein, the expression "$C_{x-y}$" where x and y are integers takes the standard meaning i.e. it means having between x and y carbon atoms in the chain.

The term "square planar" is well known in the art. In general, it refers to a coordination compound or complex having coordinating ligand atoms positioned at approximately the corners of a square around the transition metal ion centre. The skilled person recognises that some deviation from precise planarity and precise square shape is encompassed within the meaning of square planar as it is used in the art and herein.

The prefix "nano" is commonly used in the art to describe dimensions measured on the nanometre scale. In the context of the present description, "nano" means a dimension of between 0.5 and 100 nm. This can include references to prior art or comparative dimensions; specific definitions e.g. for size ranges as applicable to the products of the present invention are set out elsewhere.

As used herein, the term "passivation" has the meaning understood by the skilled person i.e. a treatment that causes a metal surface to become inert (non-reactive). As is known, this usually occurs by forming a film or coating of metal oxide on the surface of the metal.

The term "acid leaching" herein has the meaning understood by the skilled person i.e. treatment of metal with acid to extract acid-soluble components.

The term "nanocluster" is used to describe an agglomeration or accumulation of molecules having a nano-size as defined elsewhere herein. The term encompasses, but is not necessarily limited to, randomly aligned or ordered arrangements of molecules, such as stacks or chains. No shape limitation is intended.

Where the present specification refers to "a" or "an", this encompasses the singular and plural forms. For example, as the skilled person will appreciate, although the methods refer to the preparation or formation of "a" nanoparticle for convenience, it is understood that in practice a plurality of nanoparticles will result.

Method

In general, a first stage of the methods of the invention involves the provision of a suitable number of a certain class of metal ion-containing compounds, wherein the metal ions of these compound(s) combine to form metal-containing nanoparticles. The metals are typically transition metals.

Metal Ion-Containing Compounds—General

It is believed that metal-containing nanoparticles of particularly small particle size and homogeneous distribution can be produced from metal ion-containing compounds that can form stacks or chains in which the metal ions are aligned. These stacks or chains can be of variable length. Such metal-ion containing compounds are generally, though not exclusively, complexes having a $d^8$ configuration. Suitable compounds generally adopt a square planar configuration. This is represented schematically in e.g. FIG. 4 using a glyoxime derivative by way of non-limiting example. This figure shows theoretically that the molecules can position themselves such that the metal ions M come comparatively close to one another and form a chain-like arrangement. Thus, when several kinds of metal ion are present as used in the present invention, it is believed that these kinds of molecules can form an intimate blend.

Complexes capable of forming such a "chain-like" arrangement have been described in the literature, see e.g. Day (Chimica Acta Reviews, 1969, 81), Thomas and Underhill (Chem. Soc. Rev. 1, 99 1972); Kamata et al. (Mol. Cryst. Liq. Cryst., 1995, 267, 117).

These references describe that two main kinds of compounds can form such arrangements. These are metal glyoximes, metal salicylaldimines and derivatives of each of these. These kinds of compounds are expected to be particularly suitable for use in the present invention. Each of these kinds of compounds can act as a bidentate ligand. The glyoxime-based ligands can coordinate to the central metal atom by two N atoms and the salicylaldimine-based ligands through one N and one O atom.

Figure 4A:
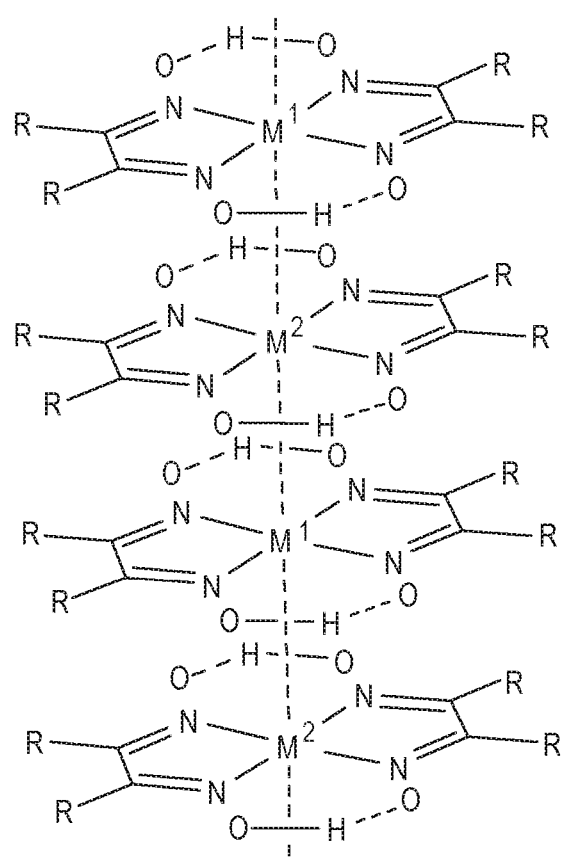
FIG. 4a is a schematic representation showing the theoretical result of combining two kinds of metal glyoximes, with the different first and second metal centres represented by $M^1$ and $M^2$, respectively. R represents H or a derivative group as described herein.
Figure 4B:
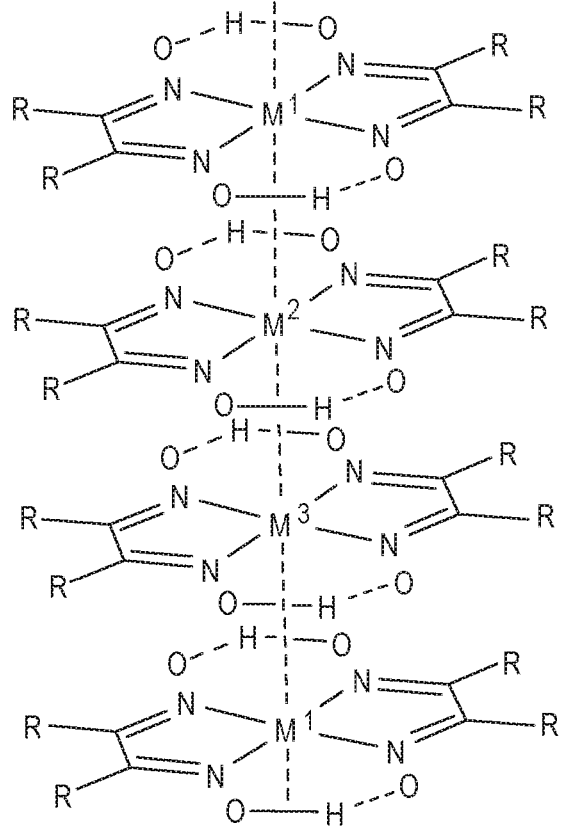
FIG. 4b is a schematic representation showing the theoretical result of combining three kinds of metal glyoximes, with the mutually different first, second and third metal centres represented by $M^1$, $M^2$ and $M^3$, respectively. R represents H or a derivative group as described herein.

Without wishing to be bound by theory, it is believed that in the present invention the ability of these kinds of compounds to form chain-like arrangements with closely-positioned metal ions is important. Particularly, it is thought that when two kinds of metal ions are present, these kinds of compounds are capable of stacking such that the different kinds of metal ion are intimately mixed. See e.g. FIG. 4, in which $M^1$ represents a first kind of metal atom and $M^2$ represents a second kind of metal atom and $M^3$ represents a third kind of metal atom. [R represents H or alternatively a derivative group, as discussed further below.] FIG. 4a represents a situation in which two kinds of metal ion are present i.e. it is expected that a bimetallic alloy or a mixture of two metals will result. FIG. 4b represents a situation in which three mutually different kinds of metal ion are present i.e. it is expected that a trimetallic alloy or mixture of three metals will result. Of course, alloys or mixtures should still result even if the alternation of the kind of metal ion is not a precisely homogeneous alternation as represented by FIG. 4. Thus, FIG. 4 is representative and not limiting herein and in practice some degree of randomization in the sequence of metal ions would not be unexpected. Further, it has been described (e.g. Day and Thomas referenced above) that in certain cases the glyoxime portion of the molecule can be rotated around the axis of the metal ion chain compared to adjacent molecules in solid state crystals. FIG. 4 is not intended to exclude such rotation.

A more detailed description of metal glyoximes, metal salicylaldimines and their respective derivatives follows now.

Metal Glyoximes and Derivatives Thereof

Metal glyoxime-based compounds comprise a metal atom and an appropriate number of glyoxime or glyoxime derivatives surrounding the metal atom. In the present invention, the metal is a transition metal, and there are (usually two) glyoxime or glyoxime derivatives surrounding the transition metal ion. Such compounds generally form a substantially square planar arrangement.

The present methods preferably employ a metal glyoxime or a metal glyoxime derivative as the metal ion-containing compound, and most preferably a metal glyoxime derivative.

Glyoxime has the formula $C_2H_4N_2O_2$. It has the following structure (only one conformation is shown):

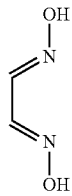

The two N atoms of each glyoxime molecule typically coordinate to the central metal ion in the resulting complex.

A glyoxime derivative, as used herein, is glyoxime in which at least one hydrogen of the two C—H groups is substituted for an optionally substituted R group. Thus, a glyoxime derivative can be described by the formula (HO)N=C(R1)-C(R2)=N(OH).

In the present invention, each of R1 and R2 is independently H, hydroxy, alkoxy, carboxy or optionally substituted alkyl, aryl or heteroaryl group. Thus, where each of R1 and R2 is H, glyoxime results. Where one of R1 and R2 is not H, a glyoxime derivative results.

Preferably, R1=R2 i.e. preferably the glyoxime or derivative thereof is symmetrical. In some preferred embodiments, R1 and R2 are not both H.

Thus, a glyoxime derivative can have a —R'OH, —R'COOH or optionally substituted alkyl, optionally substituted aryl, or optionally substituted heteroaryl substituent in place of at least one, and preferably both, of the hydrogens attached to the carbon backbone of the glyoxime molecule. The expression "optionally substituted alkyl, aryl or heteroaryl" herein means that each of the alkyl aryl or heteroaryl groups can be optionally substituted. The group R' represents a single bond or alkyl group as defined herein.

Preferably, the glyoxime derivative has an optionally substituted alkyl, aryl or heteroaryl group.

Where R1 and/or R2 is an alkyl group, the alkyl can be linear, branched or cyclic. Cyclic alkyl encompasses the situation wherein R1 and/or R2 are independently cyclic alkyl groups, and wherein R1 and R2 join to each other to form a cyclic alkyl.

Linear or branched alkyl can be $C_1$-10 alkyl, preferably $C_{1-7}$ alkyl and more preferably $C_{1-3}$ alkyl. In certain preferred embodiments, R1 and/or R2 is $C_1$ alkyl (i.e. methyl).

Cyclic alkyl (also called cycloalkyl) can be $C_{3-10}$ cycloalkyl, preferably $C_{5-7}$ cycloalkyl, and more preferably C6 cycloalkyl.

In the most preferred embodiments, R1=R2=$C_1$ alkyl.

Where R1 and/or R2 is aryl, this means aromatic hydrocarbon. Suitably, aryl means a $C_{6-9}$ aromatic group e.g. a phenyl or naphthyl group. Particularly preferred are phenyl ($C_6$) based aryl groups.

Where R1 and/or R2 is heteroaryl, this means aromatic hydrocarbon wherein one or more, preferably one, of the ring atoms is a nitrogen, oxygen or sulfur group. Preferably one of the ring atoms is nitrogen or oxygen, and particularly preferably it is oxygen. The heteroaryl group usually contains 5 to 7 ring atoms, including the heteroatom(s). Examples of suitable heteroaryl groups include pyridine, pyrazine, pyrrole, imidazole, pyrazole, oxazole, thiophene and furan. In preferred embodiments, the heteroaryl group is a furan. The heteroatom can be placed at any orientation, but is preferably in the alpha position.

The optional substituents of the R1/R2 groups are independently typically-R'OH, —R'COOH, or unsubstituted linear or branched $C_{1-10}$ alkyl, $C_{5-7}$ aryl or $C_{5-7}$ heteroaryl. R' is as defined above. Preferably, the optional substituents are $C_{1-10}$ alkyl, and most preferably $C_{1-5}$ alkyl. Preferably, there is only one of the optional substituents present, if any.

Examples of suitable glyoxime derivatives in accordance with the above are: isopropylnioxime, 4-t-amylnioxime, nioxime, 4-methylnioxime, dimethylglyoxime, ethylmethylglyoxime, furil-α-dioxime, 3-methylnioxime, benzil-α-dioxime, heptoxime.

Particularly preferred in the methods described herein are metal dimethylglyoximes (metal-DMGs). Dimethyl glyoxime has the following structure:

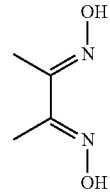

Typically, in accordance with the above, there are two DMG molecules surrounding each metal centre in a square planar configuration. For example, when Pt is the central ion and the glyoxime derivative is DMG, platin bis (dimethylglyoxime) is the metal glyoxime derivative precursor:

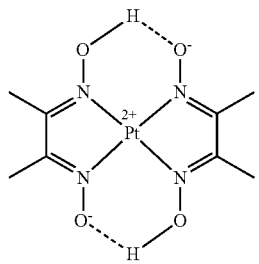

Different kinds of glyoxime or derivative can be used to provide the same metal. For example, a source of Pt may be Pt-DMG$_2$ and Pt-nioxime$_2$. Typically, only one kind of glyoxime or derivative thereof is used to provide a single kind of metal. Different kinds of glyoxime or derivative thereof can be present in the same complex, e.g. Pt-DMG-nixoime, though this is not typical.

In embodiments in which there are more than one metal ion-containing compound, and where more than one kind of metal ion-containing compound is a glyoxime or derivative thereof, it is not necessary that the glyoxime or derivative thereof be the same for each different kind of metal centre. For example, a Pt-containing compound may be Pt-DMG$_2$ while a Ni-containing compound may be Ni-nioxime$_2$. However, typically, only one kind of metal glyoxime or precursor thereof is provided for each kind of metal ion, e.g. Pt-DMG$_2$ and Ni-DMG$_2$.

Salicylaldimines and Derivatives Thereof

Salicylaldimine-based compounds comprise a metal atom and an appropriate number of salicylaldimine or salicylaldimine derivatives surrounding the metal atom. In the present invention, the metal is a transition metal, and there are two salicylaldimine or salicylaldimine derivatives surrounding the transition metal ion. Suitable compounds have a substantially square planar arrangement. It is noted that salicylaldimine containing complexes are sometimes known as salicylaldiminate or salicylaldiminato complexes.

Salicylaldimine has the formula C$_7$H$_5$NO. It has the following structure (only one conformation shown):

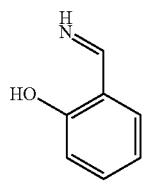

Each of the N and O atoms of each salicylaldimine molecule coordinates to the central metal ion in the resulting complex. The N atom is usually shown as being positively charged when coordinated to a metal centre.

A metal salicylaldimine derivative, as used herein, means a complex having two salicylaldimine derivatives coordinated to the central metal ion through their N and O atoms. A salicylaldimine derivative, as used herein, is salicylaldimine in which the hydrogen of the N—H group is substituted for an optionally substituted group R3 i.e. they are N-methyl derivatives. Thus, a salicylaldimine derivative can be described by the formula (R3)N=CH-Ph-OH where Ph represents phenyl and the OH group is located ortho to the (R3)N=CH group.

In the present invention, R3 is H, hydroxy, alkoxy, carboxy or optionally substituted alkyl, aryl or heteroaryl group. Thus, where R3 is H, salicylaldimine results. Where R3 is not H, a salicylaldimine derivative results.

Thus, a salicylaldimine derivative can have a —R'OH, —R'COOH or optionally substituted alkyl, aryl or heteroaryl group in place of the H attached to the N atom. The group R' represents a single bond or alkyl group as defined below.

Where R3 is an alkyl group, the alkyl can be linear, branched or cyclic.

Linear or branched alkyl can be C$_{1-10}$ alkyl, preferably C$_{1-7}$ alkyl and more preferably C$_{1-3}$ alkyl. In certain embodiments, R3 is C$_1$ alkyl (i.e. methyl).

Cyclic alkyl (also called cycloalkyl) can be C$_{3-10}$ cycloalkyl, preferably C$_{5-7}$ cycloalkyl, and more preferably C$_6$ cycloalkyl.

Where R3 is aryl, this means aromatic hydrocarbon. Suitably, aryl means a C$_{6-9}$ aromatic group e.g. a phenyl or naphthyl group, preferably phenyl (C$_6$) based aryl group.

Where R3 is heteroaryl, this means aromatic hydrocarbon wherein one or more, preferably one, of the ring atoms is a nitrogen, oxygen or sulfur group. Preferably one of the ring atoms is nitrogen or oxygen, and particularly preferably it is oxygen. The heteroaryl group usually contains 5 to 7 ring atoms, including the heteroatom(s). Examples of suitable heteroaryl groups include pyridine, pyrazine, pyrrole, imidazole, pyrazole, oxazole, thiophene and furan. In preferred embodiments, the heteroaryl group is a furan. The heteroatom can be placed at any orientation, but is preferably in the alpha position.

The optional substituents of the R3 group are typically-R'OH, —R'COOH, or unsubstituted linear or branched C$_{1-10}$ alkyl, C$_{5-7}$ aryl or C$_{5-7}$ heteroaryl. R' is as defined above. Preferably, the optional substituents are C$_{1-10}$ alkyl, and most preferably C$_{1-5}$ alkyl. Preferably, there is only one of the optional substituents present, if any.

Most preferably, in the salicylaldimine derivatives, R3 is unsubstituted alkyl or aryl, and most preferably unsubstituted alkyl. In the most preferred embodiments, R3 is C$_1$ alkyl.

A particularly suitable salicylaldimine derivative in accordance with the above is N-methylsalicylaldimine.

As with the glyoxime-based metal ion-containing compounds, different kinds of salicylaldimine or derivative can be used to provide the same metal. Typically, only one kind of salicylaldimine or derivative thereof is used to provide a single kind of metal.

As with the glyoxime-based metal ion-containing compounds, where more than one kind of metal ion-containing compound is a salicylaldimine or derivative thereof, it is not necessary that the salicylaldimine or derivative thereof be the same for each different kind of metal centre, or the same in a single complex. However, typically, only one kind of metal salicylaldimine or precursor thereof is provided for each kind of metal ion and in a single complex.

Also envisioned are embodiments in which at least one metal is provided by a metal salicylaldimine-based compound and at least one metal is provided by a metal glyoxime-based compound.

Metal Centres

Suitable metal centres are generally transition metal elements, so long as they can form the complexes explained herein. By "transition metal elements", we mean those elements in Groups 3 to 12 of the periodic table, and include the platinum group metals (PGMs). Typically, the metal ion-containing compounds will include one or more metals selected from the group consisting of Pt, Pd, Fe, Ni, Ir, Ru, Rh, Co, Cu, Ag and Au. Preferably, the metal centres comprise those selected from the group consisting of Pt, Ni, Ir, Rh, Fe, Cu and Co, and more preferably Pt, Ni, Ir, Rh and Cu. Most preferred for the present applications are Pt and Ni. For example, Ni rich Pt cubic alloy phases may be prepared by methods of the present invention. Suitably, for the catalytic applications described herein, one of the metal centres of the at least two metal ion providing complexes is Pt.

Without wishing to be bound by theory, the inventors believe that certain elements, such as Ni, Fe and Co, may assist in the formation of the coating (overlayer) described elsewhere.

The metal ions of the metal glyoximes or salicylaldimines or derivatives thereof make up the metals in the metal-containing nanoparticles described herein. Thus, if a bimetallic alloy is wanted, metal ion-containing compounds having two kinds of metal ion should be provided; if a trimetallic alloy is wanted, metal ion-containing compounds having three kinds of metal ion should be provided, and so on. If a single metal nanoparticle is wanted, metal ion-containing compounds having one kind of metal ion should be provided.

Provision of Metal Ion-Containing Compounds

The metal ion-containing compound(s) may be purchased directly. Alternatively, they may be synthesized from precursors using methods known to the skilled person.

By way of example for the glyoxime or derivative thereof, synthesis from precursors generally involves the combination of a glyoxime-based ligand such as dimethylglyoxime (DMG) with a metal salt and forming a solution, typically an aqueous solution. A precipitate of the metal glyoxime or derivative thereof results.

Typically, metal:ligand ratios of around 1:2 are used. The range may be between 1:10 to 1:2, such as 1:5 to 1:2. Higher proportions of metal are less preferred due to cost.

As an example, to prepare platin bis (dimethylglyoxime), an exemplary approach is as follows:

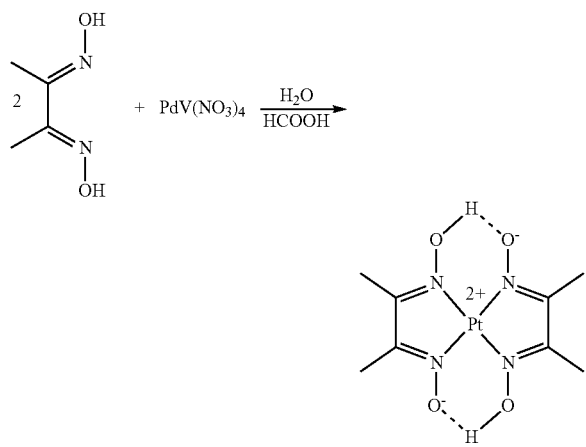

The metal glyoxime or derivative thereof that precipitates can be purified (i.e. separated from other components of the solution) in an appropriate manner e.g. by filtration and/or washing and/or drying. The skilled person will be aware of suitable purification steps.

In some preferred embodiments, the glyoxime-containing solution may be stirred and/or heated before and/or during precipitate formation. In some preferred embodiments, the heating follows the stirring.

Suitable stirring and/or heating periods will depend on the amounts and kinds of glyoxime-containing solutions, but may be for example up to 4 hours, up to 3 hours, up to 1 hour or up to 30 mins.

Suitable heating temperatures will be known to the skilled person, and may include for example up to 80° C., up to 60° C. or up to 40° C.

Suitable metal salts will be known to the skilled person, but non-limiting examples may include one or more selected from metal halides, metal nitrates, and metal acetates.

In some embodiments, the glyoxime-containing solution is acidified before it is stirred and/or heated. The skilled person can choose from among suitable acids, which may be weak or strong according to preference. Typically, the acid is organic. Non-limiting examples may include carboxylic acids such as formic acid or acetic acid.

In preferred embodiments, the composites of the invention are prepared by using a precipitation deposition method. Broadly, a suitable number of metal ion-containing compound(s) is/are dissolved in solution, which is usually basic, in the presence of a support. They are precipitated on the support with a suitable amount of acid. Without wishing to be bound by theory, it is thought that the rigid ligand framework of the compounds described herein contribute to stability of the complex (e.g. low lability) across a range of pH values. The precipitation has been found to be approximately quantitative i.e. most of the metal that is added as a complex is found to be precipitated. This method gives a good distribution of the nanoparticles across a support (where present), good catalyst activity and stability, and can be used with a wide range of supports.

Accordingly, preferably in the methods described herein, powders of the one or more metal ion-containing compound(s) can be added to a solvent to form a solution containing the dissolved metal ion-containing compound(s). Where more than one kind of metal ion-containing compound is used, they may be provided as separate solutions (and using different solvents if wanted), such that the separate solutions are later combined, or they may be dissolved together in a single solution. Suitable solvents include water (and aqueous solutions), polar organic solvents. As examples of suitable polar organic solvents, mention is made of DMF and DMSO, though the invention is not limited thereto. Mixtures of suitable solvents may be used. Preferably, the solvent is aqueous. The formation of an aqueous solution can be advantageous from a safety and manufacturing perspective.

In some preferred embodiments, the metal ion-containing compounds (especially metal glyoximes or derivatives thereof) may be dissolved to form aqueous solution(s) by adding a base. Suitably, the solution(s) containing the metal-ion containing compound(s) is alkaline. The pH is preferably more than 8, e.g. 9. Suitable bases will be known to the skilled person, but include for example ammonium derivatives such as ammonium hydroxide and tetraethylammonium hydroxide, or sodium hydroxide and potassium hydroxide.

In a general way, the solution(s) of the metal-ion containing compounds prepared as described above can be combined with another, compatible liquid if wanted. It preferably contains a support. The support can thus be suitably a suspension or dispersion in the liquid. This further liquid is thus preferably polar, most preferably aqueous.

Typically, addition of the appropriate amount of metal ion-containing compounds to the liquid occurs dropwise, but may in certain instances be carried out as a single addition or as multiple additions. Combination of the metal ion containing compounds can in this way be carried out over a suitable period. Typically, a suitable period for addition of the metal ion-containing compounds will be determined by the skilled person but conveniently will be up to an hour, such as 45 mins or 30 mins.

The metal ion-containing compound(s)—and preferably the support—are suitably mixed with the liquid prior to the heating step. Suitable methods will be known to the skilled person, but for example it is possible to combine an appropriate quantity of each desired metal ion-containing compound to form a mixture of metal ion-containing compounds, which is preferably a mixture of metal glyoximes or derivatives thereof, together with the optional support.

Following addition of the metal ion-containing compounds to the liquid, stirring typically occurs to dissolve thoroughly and combine the components and/or homogenize the dispersion. Stirring may take place for more than 1 hour, such as 4 or 8 hours or more. Conveniently, the mixture can be stirred overnight e.g. about 12 hours. Without wishing to be bound by theory, it is believed that this step allows intimate mixing and close approach of the metal ions.

Preferably and typically in the invention, a support is combined with the dissolved one or more metal ion-containing compounds. Various alternative routes of incorporating the support into the mixture are envisioned, e.g. preparing the mixture and then adding the support (usually followed by further stirring to combine the support and mixture), or adding the mixture to the support (also usually followed by further stirring). A preferred option is to provide the support in a liquid and add the metal ion-containing compounds subsequently. Stirring may also assist in good distribution of the metal-containing nanoclusters/nanoparticles across a support.

The combination of the support and one or more metal ion-containing compound(s) may be carried out with stirring. Once both the metal ion-containing compound(s) and the support are combined, the mixture is typically stirred thoroughly to combine as described above. It is preferred to use a support in the preparation methods described herein because they lead to supported nanoparticles which have improved properties for the present applications such as ease of handling and processing, as well as the desirable features mentioned above of good distribution. If a catalyst layer is wanted, the presence of a support improves the layer structure.

Suitably, the support may be provided as a dispersion or suspension in a liquid. Suitably, the liquid of the support-containing dispersion or suspension is water-based i.e. aqueous. This also assists in the dissolution of the metal ion-containing compound(s).

Suitable supports for electrocatalytic applications include electrically conductive supports, preferably comprising carbon-based supports. Examples of suitable carbon-based supports include conductive carbons such as carbon blacks, especially conductive carbon blacks, graphite powders and graphene-based materials such as nanotubes or graphene platelets. Suitably, the support may be provided as a solution, dispersion or suspension. Suitably, the solution, dispersion or suspension is water-based i.e. aqueous. This also assists in the dissolution of the metal glyoximes or derivatives thereof.

Other less preferred embodiments contemplate a non-carbon based support, such as oxides. For fuel cells or other electrocatalysts, electrically conductive supports are needed as noted above. Examples of oxides capable of being used in these applications therefore include doped niobium-, tin- and titanium-containing oxides.

After stirring thoroughly to combine, the mixture may preferably be neutralized (i.e. brought to pH 7) using any suitable acid. Suitable acids include organic and inorganic acids and mixtures thereof. Mention may be made of nitric acid, sulfuric acid and acetic acid but these are not limiting. The neutralization is optionally followed by further stirring. Again, conveniently, stirring may occur overnight e.g. around 12 hours.

The resulting mixture is typically dried at elevated temperature (e.g. at around 80° C. to around 110° C., to remove bulk solvent such as water but without burning off any of the components intended to be present in the final product). Drying is suitably carried out slowly, and conveniently overnight e.g. around 12 hours. Suitably, drying is carried out in air.

The result is a dried precursor mixture.

Heating Step

The heating step comprises heating the dried precursor mixture, containing the one or more combined metal ion-containing compound(s), and preferably a support. This step corresponds with the annealing step that provides the catalyst material from the composite described elsewhere herein.

Suitably, the heating may take place in a furnace. Preferably, heating may take place in an inert or reducing atmosphere, or a vacuum. The skilled person will be able to choose from suitable atmospheres, and it may include for example one or more of hydrogen, argon and nitrogen.

Accordingly, heating is suitably carried out at a temperature of up to 1200° C., up to 1000° C. or up to 900° C. In some embodiments, heating is carried out at a minimum temperature of 300° C., preferably at least 450° C. or 500° C. Higher temperatures, such as a minimum of 600° C. or 800° C. are particularly preferred for the preparation of preferred alloys in an inert or reducing atmosphere or vacuum. Preferably, the heating temperature is in the range of 700° C. to 1000° C., suitably 800° C. to 900° C. The skilled person can determine a suitable heating temperature, particularly for alloys, because the useful temperature range may be connected to the nature of the metal(s) employed.

Particularly for forming Pt-containing nanoparticles, e.g. Ni rich Pt cubic alloy phases, the heating temperature is suitably at least 600° C.

Suitably, the heating temperature is reached by slowly increasing the temperature. For example, the heating rate may be up to 10° C./minute, up to 5° C./minute and preferably up to 2° C./minute such as about 1.5° C./minute. In this way, the temperature is increased slowly from room temperature over several hours. The duration of the heating step is not particularly limited.

For example, the duration of the heating step (including the time taken to reach the desired heating temperature, also called the final temperature herein) can be between about 0.5 to 15 hours, preferably between about 5 and 12 hours. For example, the heating step can be carried out for up to 15 hours, up to 14 hours or up to 13 hours. The heating step is preferably carried out for at least about 5 hours, such as 6 hours or 7 hours.

In other embodiments, so-called "flash" heating can be used to achieve the desired temperature i.e. rapid heating carried out over a short period of time, such as over a matter of minutes. For example, the heating step can be carried out for up to 1 minute, such as up to 0.8 minutes or up to 0.5 minutes.

Once the final temperature is reached, the final temperature is suitably maintained for at least about 5 mins, such as 20 mins, and optionally longer. There is no particular limit on the time over which the final temperature can be maintained, but conveniently less than about 24 hours or less than about 12 hours is suitable. Typically, the final temperature is maintained for between about 0.5 and 8 hours, such as between about 0.5 and 3 hours.

Further Steps

After the heating step, the product is typically cooled, for example to room temperature. Suitably, cooling is carried out in the furnace in which heating is conducted.

Optionally, passivation may be carried out after the heating step. Passivation typically occurs at room temperature. Therefore, passivation typically occurs after cooling. Typically, passivation occurs under a mixture of an inert gas and oxygen, such as air diluted with nitrogen. Conveniently, passivation can be carried out in the same furnace as heating was carried out. Passivation can advantageously prevent further reaction of the nanoparticles.

Optionally, the resulting metal-containing nanoparticles may be subjected to an acid leaching step. Acid leaching is commonly used in the preparation of catalytic materials used in a PEM fuel cell. Therefore, suitable acids and timescales will be known to the skilled person. Purely by way of example and not limitation, the leaching step may occur over several hours such as up to 36 hours or up to 24 hours, and the acid used can be any common acid such as hydrochloric acid, sulfuric acid or nitric acid. Acid leaching can advantageously render the nanoparticles suitable for use in a fuel cell by removing acid-soluble species such as base metals from the surface of the nanoparticles.

As noted elsewhere herein, the inventors believe that in certain embodiments a coating or overlayer comprising predominantly N and C and O forms substantially over the surface of the metal alloy nanoparticles during manufacture. For certain applications, removal of this overlayer from the metal alloy nanoparticle surface may be desirable. Optionally, therefore, the metal alloy nanoparticles may be further treated to remove such overlayer. Removal of such overlayer could be achieved by any suitable method; for example, use of an oxidant.

Products

The metal-containing nanoparticles according to the present invention are nanoparticles comprising single metals, multiple metals, or oxides of each of these. The metals are transition metals.

Where the metals comprise more than one metal, the metal nanoparticles comprise at least two metals, particularly at least two transition metals. That is, such nanoparticles comprise at least two transition metals which are elements of Group 3 to 12 of the periodic table. The different metal elements are sometimes referred to herein as different kinds of metals. Preferred transition metals are set out elsewhere herein.

The at least two transition metals are preferably be alloyed together. Preferably, alloy nanoparticles are bimetallic alloy nanoparticles, but they may alternatively be trimetallic or higher alloy nanoparticles. Alternatively, embodiments are encompassed in which the at least two transition metals may not be alloyed together in the metallurgical sense, but may instead be a mixture of the metals.

Where the metal-containing nanoparticles comprise more than one metal, suitable proportions of each metal can be chosen by the skilled person according to requirements and application. Thus, the amounts of each metal in the nanoparticles herein is not particularly limited. By way of example, metal: metal molar ratios can be between around 20:1 to 1:20, preferably 10:1 to 1:10, and most preferably 5:1 to 1:5 including 1:1. Particularly in preferred embodiments in which Pt and Ni are used, molar ratios in the range 3:1 to 1:3 are preferred, including 1:1, though this range is not intended to be limited to these metals. [As the skilled person will appreciate, such ratio ranges can be written differently, e.g. 3:1 to 1:3 is 75:25 to 25:75. Corresponding weight ranges can be calculated by taking account of the mass of the metals used.]

Preferred embodiments encompass alloys prepared by the method of the present invention. These are metal alloy nanoparticles, particularly nanoparticles comprising alloys of transition metals. That is, the metal nanoparticles comprise at least two kinds of metal, particularly transition metal, alloyed together. As used herein, the term alloy has the normal meaning understood by a person skilled in the art and encompasses materials having metal-metal bonds. Preferably, the nanoparticles are bimetallic alloy nanoparticles, but they may alternatively be trimetallic or higher alloy nanoparticles.

Alternative metal-containing nanoparticles prepared according to the present methods comprise single metals, or mixtures of metals, or oxides of each of these.

A nanoparticle prepared according to the methods of the invention is typically a fine particle of one or more metals. It typically has a size of less than 50 nm, and most typically less than 20 nm. Preferably, the nanoparticles produced by the present methods have a size of around 15 nm or less. The lower size limit of the nanoparticles is not particularly limited, but they may be as small as e.g. 0.1 nm, suitably 0.5 nm and typically at least 1 nm. The range of sizes of the alloy nanoparticles produced herein are typically between 1 and 10 nm. Particularly preferred are mean particle sizes of up to 10 nm, up to 9 nm or up to 8 nm. Particularly contemplated is a mean size between 2 and 7 nm, such as for example 3 nm or 4 nm.

The size of the particle refers to the width of the particle, which is the diameter for spherical or spheroidal particles. Methods of measuring particle sizes are known to the skilled person, and may include for example analysis of TEM images.

The nanoparticles produced are typically near-spherical i.e. spheroidal (e.g. truncated-octahedral) in shape though the present invention is not limited by the shape. The metal-containing nanoparticles may be of any convenient shape, including but not limited to oval, needle-like and spherical (spheroidal, including cubo-octahedral and the like). The shape may be defined by the equilibrium crystal shape.

Without wishing to be bound by theory, the inventors believe that the present methods of metal alloy nanoparticle preparation in an inert or reducing atmosphere result in metal alloy nanoparticles having a thin film or coating (also called an "overlayer" or "shell" herein), which suitably extends substantially continuously over the product resulting from the method of the present invention. See FIG. 1 for a schematic representation, discussed further below. Although the presence of a carbon support is believed to complicate direct observance of the coating, X-ray photoelectron spectroscopy (XPS) data has been used to indirectly infer its presence. Specifically, the XPS data indicates that the coating comprises nitrogen, oxygen and carbon. It is believed that this coating, formed during the manufacture of the metal nanoparticles especially in an inert or reducing annealing atmosphere or vacuum, assists in preventing the agglomeration or sintering of the nanoparticles. Agglomeration and sintering is usually found to be particularly problematic during heating processes required for the formation of metal alloys.

This result is unexpected. US 2010/152041A1 discloses a method of preparing single-metal nanoparticles comprising heating a powder comprising a chelate complex of two dimethyl glyoxime molecules and one transition metal, optionally in the presence of alumina, at 300-400° C. to form nanoparticles of Ni. The methods of preparation described in this application involve the direct heating of the Ni-DMG powder in air, or the milling of Ni-DMG powder with alumina whiskers and subsequent heating. This document reports that Ni nanoparticles formed on carbon particles in the absence of alumina, while in the presence of alumina the Ni nanoparticles are carried on alumina. It also describes that at temperatures above 400° C., substantial sintering and/or agglomeration is observed i.e. substantially larger particles result. There is no suggestion that a coating is formed on the nanoparticles according to the methods described in this application. Thus, the present invention is more adaptable than previously known methods, at least because higher temperatures can be used with minimal sintering and/or agglomeration. There is no suggestion that a coating can be formed. It could not be predicted that a solution-based preparation of metal nanoparticles as described herein could also lead to excellent results.

FIG. 1 is a schematic representation of an alloyed product prepared according to the present methods under inert atmosphere. In FIG. 1, a support is shown in black at the bottom of the drawing. This can be any suitable support, such as a carbon support as preferred herein. In FIG. 1, the support is shown as having a flat lower surface and an irregular upper surface, but this is not limiting in the invention.

The grey hexagons represent metal alloy nanoparticles. The shape is not limiting. Additionally, although the hexagons are shown in FIG. 1 as being identical in size, this is of course also not necessarily representative of all products prepared according to the present methods i.e. the nanoparticles may be of different sizes to one another. The metal alloy nanoparticles in FIG. 1 are divided into circles to represent their alloyed nature. Like the hexagonal shape, it is not intended that the shapes are representative of the individual domains of metal within the alloyed nanoparticles because of course they could take a variety of shapes and sizes. The individual spheres can represent any suitable number of metals and may be e.g. Pt and/or Ni or any other combination described herein.

Above the support and the metal alloy nanoparticles is shown a grey layer. This represents the overlayer or coating that the inventors believe forms over the product during the methods according to the present invention. This is believed to be comprised of C, N and O. FIG. 1 shows the coating as having a variable thickness over the surface of the supported metal alloy nanoparticles. In other embodiments, the coating may have a uniform thickness. In addition, FIG. 1 shows that the coating is formed continuously over the surface. In other embodiments, there may be breaks or gaps in the coating. Usually, it is expected that the coating will be formed substantially continuously over the surface.

The metal alloy nanoparticles may be used in the form in which they are produced at the end of the cooling step, or after the optional passivation and/or leaching steps if appropriate. Alternatively, the metal alloy nanoparticles may be further processed before use. Exemplary further steps are discussed elsewhere herein.

The metal-containing nanoparticles, especially metal alloy nanoparticles, may be used as a catalytic material, particularly as an electrocatalyst. Suitably, the metal nanoparticles may be used in an electrode, either anode or cathode. The metal nanoparticles may suitably be formed into an ink according to known methods in the art. Suitably, the metal nanoparticles, or an electrode comprising the metal nanoparticles, may be used to form part of an MEA. Suitably, the metal nanoparticles, the electrode, or the MEA may be used in a fuel cell. In preferred embodiments, the fuel cell is proton exchange membrane (PEM) fuel cell.

The electrode at which the metal nanoparticles, particularly metal alloy nanoparticles, or electrocatalyst are used, and the reaction to which they are applied, will depend on the kind(s) of metal from which the nanoparticles are formed. Thus, it is envisaged that suitable nanoparticles can be prepared for use at either the anode or the cathode of a fuel cell.

It will be appreciated that use of inert or reducing atmospheres is less likely to produce oxides of the various metal-containing nanoparticles described herein. Since inert or reducing atmospheres are preferred for the preparation of metal alloys, in order to form the coating described herein to inhibit or prevent agglomeration, the present application thus prefers products which are substantially non-oxidised. Nevertheless, some oxidation e.g. partial oxidation may occur e.g. at the nanoparticle surface. Oxides as used herein can encompass mixed oxides, as well as a mixture of oxides. The skilled person is aware that certain metals e.g. Pt and Au, are generally difficult to oxidise, and in such cases other oxidation methods known to the skilled person may be needed to achieve such metal oxides if desired.

During the methods of the present invention in which a support is used, a composite material forms which in general comprises a support material and a nanocluster of molecules which are metal ion-containing molecules as defined elsewhere. In practice, the support will comprise a plurality of nanoclusters. The nanoclusters are generally dispersed or distributed across one or more surfaces of the support. That is, they are spaced (i.e. arranged with nanocluster-free areas separating them) such that individual nanoclusters can be identified. It has been found that the nanoclusters show a good distribution across the support; that is, they do not clump together or aggregate. This result is unexpected for the skilled person.

Depending on the kind of support used, it may be possible to control the location and/or distribution of the nanoclusters.

Without wishing to be bound by theory, it is believed that the nanoclusters comprise stacks of metal ion-containing compounds, having aligned chains of metal ions. This ability to form stacks is thought to lead to a close metal-metal interaction, intimate mixing (stacking) of the metal ions, and with fast precipitation during the preparation process. Accordingly, diffusion distances are small and thus little movement is needed by the metal ions on heating to form metal-containing nanoparticles, especially metal alloy-containing nanoparticles.

The composite is an intermediate formed during the methods of the present invention, following deposition and precipitation of the metal ion-containing compound(s) on a support, but before the heating step which acts to separate, partially separate, decompose or substantially decompose the ligands from the metal ion of the metal ion-containing compounds. Although an intermediate, the composite can be isolated and assessed. The composite can be annealed/heated/fired to provide metal-containing nanoparticles. [The heating step is sometimes referred to as annealing or firing herein.] That is, the ligands of the metal ion-containing compounds (complexes) are partially, substantially or completely removed or separated from the metal ion and the metal ions themselves form metal-metal bonds. In some instances, complete removal of the ligands is contemplated. The resulting material, sometimes called an "active" material, may find utility as an electrocatalyst. It is noted that the composite containing the nanoclusters may also be active e.g. as an electrocatalyst; this possibility is not intended to be excluded.

Thus, in general, the catalyst materials are prepared by converting the nanoclusters of metal ion-containing compounds into metal-containing nanoparticles. This is typically achieved by annealing as explained above. The annealing process is believed to decompose the metal ion-containing compounds, thereby removing, or substantially removing, the ligands of the metal ion-containing compounds. This in turn allows the metal ions to bond and metal-containing nanoparticles to form from the nanoclusters.

Accordingly, if the nanoclusters contain metal ion-containing compounds having one kind of metal ion, the annealing process provides a catalytic material having single-metal nanoparticles. If the nanoclusters contain more than one kind of metal ion in the metal ion-containing compounds, the annealing process provides a catalytic material having multi-metal nanoparticles. Preferred annealing conditions are set out elsewhere.

The loading of the metal on the support will be determined by the skilled person according to the application desired. However, in general it is expected that a metal loading of up to 90 wt %, such as around 80 wt % or less will be of interest. Suitable metal loadings are at least 0.5 wt % such as 10 wt % or more. Suitable ranges of metal loadings may be between 10-90 wt %, preferably between 20-70 wt % and most preferably between 30-60 wt %. The loading amounts here are metal on support and are not intended to encompass the weight of any overlayer (coating) described elsewhere.

The nanoclusters may show a slightly smaller size than the final nanoparticles, or a similar size, or may be slightly larger than the final nanoparticles (e.g. if they shrink during the firing step as the ligands are decomposed). Thus, the nanoclusters in general are expected to be measured at a mean size which is less than 10 nm, typically less than 7 nm and less than 5 nm. The nanoclusters may have a mean size which is more than 0.5 nm, typically more than 1 nm and in some instances more than 1.5 nm. In general, the mean size range of the nanoclusters is between around 0.5 nm and 10 nm, typically between 1 nm and 7 nm and preferably between 1.5 nm and 5 nm, such as 2 nm or 3 nm.

The size of the nanoclusters and nanoparticles can be measured by TEM analysis according to protocols known to the skilled person. For example, a TEM image may be taken and appropriate software used to determine particle or cluster width. Alternatively, the image may be printed and the measurement made by hand.

The composition of the product nanoclusters and nanoparticles can be confirmed using known methods. For example, energy-dispersive X-ray (EDX) analysis can be used; and/or X-ray diffraction (XRD) patterns; and/or XPS analysis.

The metal-containing nanoparticles may be used as part of an electrocatalytic material. For such applications, nanoparticles or supported nanoparticles may be processed according to known methods. By way of non-limiting example, the nanoparticles or supported nanoparticles can be formed into an ink and subsequently deposited as a catalytic layer on an electrode.

Preferences

Preferred embodiments of the invention concern the preparation of supported metal alloy nanoparticles prepared from metal glyoxime-based precursors using a deposition and precipitation method.

The preferred deposition and precipitation methods involve dissolution of metal glyoxime-based precursors in one or more suitable solvents (usually aqueous, polar, or mixtures thereof) in the presence of a carbon-containing support. Nanoclusters of the metal glyoxime-based precursors are precipitated across the support by acidification of the dispersion, to form a composite. The composite can be considered a precursor to the supported metal alloy nanoparticles.

In these preferred embodiments, the composite is subjected to heating to at least 600° C. under an inert atmosphere so as to form metal alloy nanoparticles across the support surface. During formation of the metal alloy nanoparticles, it is believed that a coating or overlayer also forms across the metal alloy nanoparticle and support (if present) surface, which coating is believed to inhibit or minimise the agglomeration of the metal alloy nanoparticles formed.

The materials so prepared have been found to have a particularly small and uniform particle size and good distribution across a support. It is also possible to make nanoparticles of two or more different metals as an alloy. Therefore, they are expected to show good functionality in the electrocatalytic applications described herein.

However, it will be understood that the invention is not limited to the above-listed combinations of preferred features, which are provided for illustration purposes only.

EXAMPLES

Comparative Example 1

The comparison nanoparticles were prepared as follows. Pt was deposited on carbon according to the proposals described in WO 2013/045894 A1. Ni nitrate was added to Pt/C and heated. After stirring overnight, the PtNi/C material was recovered, washed dried and annealed in a corresponding manner to that of the nanoparticles prepared according to the present invention, described below.

In an alumina dish, the sample was placed in the tube furnace and purged under $N_2$ for 30 mins. Under Ar, the sample was heated to 900° C. over 12h (heating rate approximately 1.2° C. min-1). This was held for 1 h and allowed to cool. Passivation was carried out using $N_2$ and air before removing the sample from furnace.

The alloyed PtNi/C material was then washed in aqueous and subsequently alcoholic $H_2SO_4$ solution (20 m$lg^{-1}$ of material) to leach out at least a portion of the Ni. Both washing steps were carried out for 24 hours.

Example 1

$PtNi_2$ alloy nanoparticles on a carbon support were prepared according to methods of the invention. Data arising from this preparation is shown in FIG. 3.

To prepare the alloy nanoparticles, 4 g of carbon support was dispersed in 800 ml of demineralised water. The Pt precursor (platin bis(dimethylolyoxime) (Pt-$DMG_2$), 6.56 g, 3 g Pt) was dissolved in 1l demineralised water with addition of enough tetraethylammonium hydroxide ($NEt_4OH$) to give a clear solution. Also provided was a Ni precursor (9.14 g, 1.8 g Ni) in 600 ml demineralised water with addition of enough $NEt_4OH$ to give a clear solution. The two precursor solutions were added dropwise to the carbon-containing dispersion, with stirring, over 30 mins and stirred together overnight. The pH was adjusted to 7 with $H_2SO_4$ and after again stirring overnight, the PtNi/C material was recovered and dried. It was then annealed and acid washed as for Comparative Example 1 above.

Results

FIG. 2 shows TEM images that can be used to compare metal alloy nanoparticles of Pt and Ni deposited on a carbon support prepared according to Comparative Example 1 (FIG. 2a) and according to Example 1 (FIG. 2b). The metal alloy nanoparticles are visible as white spots, separated by areas of grey. The pale grey in FIG. 2b indicates the support and/or overlayer. This comparison shows that methods of the present invention produce metal alloy nanoparticles that are substantially more homogeneous than prior art methods. No large particles such as those seen on the left and top of FIG. 2a are observed in FIG. 2b. In addition, the nanoparticles shown in FIG. 2b have a more uniform dispersion than those shown in FIG. 2a. The invention provides metal alloy nanoparticles of small size. FIG. 2b also shows that the metal alloy nanoparticles produced are substantially spherical (near spherical) in this instance.

FIG. 3a shows a TEM image of supported metal alloy nanoparticles comprising Pt and Ni. The metal nanoparticles are visible as black spots, separated by areas of grey. The product was measured by XPS to contain a 1:1.6 ratio of Pt:Ni. The XPS data also indicated the presence of an overlayer containing C, O and N. As with FIG. 2b, it can be seen that these particles display high homogeneity, substantially even dispersion and a spherical nature.

FIG. 3b is a representative particle size distribution of the particles shown in FIG. 3a. It can be seen that the nanoparticles had a diameter of more than 1 nm and less than 5 nm. The mean particle size was 2.63 nm.

FIGS. 3c and 3d show the distribution of the Ni and Pt through the sample. The Ni and Pt are each distributed substantially evenly through the sample. That is, there are no areas showing Pt-only or Ni-only materials. This supports the assertion that the nanoparticles are alloys of Pt and Ni.

FIG. 3e is the diffraction pattern of the sample. The added vertical lines correspond to a $Pt_{0.5}Ni_{0.5}$ reference demonstrating that this is a closely related composition though the diffraction pattern is slightly shifted to the left suggesting more Pt than the reference. The feature at $2\theta \approx 25$ corresponds to the carbon support.

It will be appreciated by persons skilled in the art that the above embodiments have been described by way of example only, and not in any limitative sense, and that various alterations and modifications are possible without departure from the scope of the invention as defined by the appended claims.

The invention claimed is:

1. A method of forming metal-containing nanoparticles or oxide thereof, the method comprising:
   a. providing one or more transition metal ions by providing one or more metal ion-containing compounds;
   b. dissolving the one or more metal ion-containing compounds in a solvent to form a solution phase comprising the one or more metal ion-containing compounds as a solute dissolved in the solvent, followed by drying the one or more metal ion-containing compounds that are dissolved in the solvent in order to recover a dried one or more metal ion-containing compounds;
   c. a heating step in which the dried one or more metal ion-containing compounds are subjected to a temperature of at least 300° C. to form metal-containing nanoparticles or oxide thereof;
   d. a cooling step comprising cooling the product of step c;
   e. optionally, a passivating step in which the product of step d is passivated; and/or
   f. optionally, a step of acid leaching the product of step d, or, if step e is performed, a step of acid leaching the product of step e;

wherein the one or more metal ion-containing compounds are transition metal complexes having ligands coordinated to a transition metal ion, the ligands being selected from the group consisting of glyoxime; a glyoxime derivative; salicylaldimine; and a salicylaldimine derivative.

2. The method according to claim 1, wherein at least two transition metal ions are provided by at least two metal ion-containing compounds.

3. Metal-containing nanoparticles or oxide thereof, prepared by the method of claim 1.

4. An electrocatalyst comprising the metal-containing nanoparticles or oxide thereof according to claim 3.

5. An electrode comprising an electrocatalyst according to claim 4.

6. A membrane electrode assembly comprising an electrode according to claim 5.

7. A fuel cell comprising the membrane electrode assembly according to claim 6.

8. The method according to claim 1, wherein the ligands are glyoxime or a derivative thereof, preferably having the formula (HO)N=C(R1)-C(R2)=N(OH), wherein R1 and R2 are each independently H, hydroxy, alkoxy, carboxy or optionally substituted alkyl, aryl or heteroaryl group, or R1 and R2 join together to form a cyclic alkyl.

9. The method according to claim 1, wherein step a further comprises providing a support such that the metal or metal alloy nanoparticles or oxide thereof are formed on the support.

10. The method according to claim 1, wherein the metal ion-containing compound(s) comprise(s) one or more transition metal ions chosen from the group consisting of Pt, Pd, Fe, Ni, Co, Ir, Ru, Rh, Cu, Ag and Au.

11. The method according to claim 1, wherein at least one of the metal ion-containing compounds comprises a transition metal ion which is Pt or Ni.

12. The method according to claim 1, wherein the temperature of the heating step is between 600° C. and 1000° C.

13. The method according to claim 1, wherein the heating step is carried out in an inert or reducing atmosphere or vacuum.

14. The method according to claim 1, wherein the ligands are salicylaldimine or a derivative thereof, preferably having the formula (R3)N=CH-Ph-OH where Ph represents phenyl and the OH group is located ortho to the (R3)N=CH group, and R3 represents H, hydroxy, alkoxy, carboxy or optionally substituted alkyl, aryl or heteroaryl group.

* * * * *